(12) United States Patent
Duan

(10) Patent No.: US 11,999,272 B2
(45) Date of Patent: Jun. 4, 2024

(54) CHILD SAFETY SEAT

(71) Applicant: Wonderland Switzerland AG, Steinhausen (CH)

(72) Inventor: Xiao Song Duan, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/135,675

(22) Filed: Apr. 17, 2023

(65) Prior Publication Data

US 2023/0249593 A1  Aug. 10, 2023

Related U.S. Application Data

(63) Continuation of application No. 17/579,696, filed on Jan. 20, 2022, now Pat. No. 11,667,219, which is a (Continued)

(30) Foreign Application Priority Data

Nov. 14, 2018 (CN) .......................... 201811357761.7

(51) Int. Cl.
*B60N 2/28* (2006.01)
*B60N 2/22* (2006.01)

(52) U.S. Cl.
CPC ......... *B60N 2/2851* (2013.01); *B60N 2/2222* (2013.01); *B60N 2/2227* (2013.01); *B60N 2002/2204* (2013.01)

(58) Field of Classification Search
CPC ................ B60N 2/2222; B60N 2/2851; B60N 2002/2204; B60N 2/2872; A47D 1/004; A47D 1/002

See application file for complete search history.

(56) References Cited

U.S. PATENT DOCUMENTS 7,604,294 B2 * 10/2009 Jane Santamaria .. B60N 2/2872
297/410
2006/0261656 A1 * 11/2006 Davis ..................... B60N 2/809
297/410
(Continued)

FOREIGN PATENT DOCUMENTS

EP    1873006 A2    1/2008
EP    1904335 B1    8/2017
(Continued)

OTHER PUBLICATIONS

EESR in corresponding European patent application No. 23160739.1.

*Primary Examiner* — Milton Nelson, Jr.
(74) *Attorney, Agent, or Firm* — NZ CARR LAW OFFICE

(57) ABSTRACT

A child safety seat includes a seat portion, a backrest assembly connected with the seat portion, and a backrest adjusting system carried with the backrest assembly and including a lock. The backrest assembly including a first portion, a second portion slidably connected with the first portion, and a third portion slidably connected with the second portion. The lock includes a first latching part operable to lock and unlock the third portion with respect to the second portion, and a second latching part operable to lock and unlock the first portion with respect to the second portion, the second latching part being coupled to the first latching part so that the first and second latching parts are movable in unison relative to the backrest assembly.

24 Claims, 15 Drawing Sheets

Related U.S. Application Data continuation of application No. 17/126,008, filed on Dec. 17, 2020, now Pat. No. 11,260,778, which is a continuation of application No. 16/682,256, filed on Nov. 13, 2019, now Pat. No. 10,906,434.

(56) References Cited

U.S. PATENT DOCUMENTS

| | | | | |
|---|---|---|---|---|
| 2013/0113267 A1* | 5/2013 | Davis | ............... | B60N 2/888 |
| | | | | 297/464 |
| 2014/0049081 A1* | 2/2014 | Davis | ............... | B60N 2/2851 |
| | | | | 297/256.11 |
| 2017/0282758 A1* | 10/2017 | Mitchell | ............... | B60N 2/2812 |
| 2018/0222358 A1* | 8/2018 | Oswald | ............... | B60N 2/2827 |

FOREIGN PATENT DOCUMENTS

| | | | |
|---|---|---|---|
| WO | 2004000602 A1 | 12/2003 | |
| WO | WO-2008031583 A2 * | 3/2008 | ........... B60N 2/2851 |

* cited by examiner

CHILD SAFETY SEAT

CROSS-REFERENCE TO RELATED APPLICATION(S)

This application is a continuation of U.S. patent application Ser. No. 17/579,696 filed on Jan. 20, 2022, which is a continuation of U.S. patent application Ser. No. 17/126,008 filed on Dec. 17, 2020, now granted as U.S. Pat. No. 11,260,778 B2, which is a continuation of U.S. patent application Ser. No. 16/682,256 filed on Nov. 13, 2019, now granted as U.S. Pat. No. 10,906,434 B2, which claims priority to Chinese patent application no. 201811357761.7 filed on Nov. 14, 2018.

BACKGROUND

1. Field of the Invention

The present invention relates to child safety seats.

2. Description of the Related Art

A child safety seat is typically used in an automobile vehicle to properly restrain a child in the event of accidental collision. The child safety seat usually has a backrest provided with a headrest that is movable along the backrest for height adjustment in accordance with the size of the child. Unfortunately, this conventional construction can only provide a limited range of height adjustment that may not be suitable for children of all sizes.

Therefore, there is a need for an improved child safety seat that can offer a larger range of height adjustment and address at least the foregoing issues.

SUMMARY

The present application describes a child safety seat including a backrest assembly that has multiple stages of height adjustment adapted to children of different sizes and ages.

According to one aspect, the child safety seat includes a seat portion, a backrest assembly connected with the seat portion, and a backrest adjusting system carried with the backrest assembly and including a lock. The backrest assembly including a first portion, a second portion slidably connected with the first portion, and a third portion slidably connected with the second portion. The lock includes a first latching part operable to lock and unlock the third portion with respect to the second portion, and a second latching part operable to lock and unlock the first portion with respect to the second portion, the second latching part being coupled to the first latching part so that the first and second latching parts are movable in unison relative to the backrest assembly.

According to another aspect, the child safety seat includes a seat portion, a backrest assembly connected with the seat portion, and a backrest adjusting system carried with the backrest assembly and including a lock. The backrest assembly includes a first portion, a second portion slidably connected with the first portion, and a third portion slidably connected with the second portion. The lock includes a first latching part operable to lock and unlock the third portion with respect to the second portion, and a second latching part operable to lock and unlock the first portion with respect to the second portion, the second latching part being disposed adjacent to the first latching part.

DETAILED DESCRIPTION OF THE EMBODIMENTS

Figure 1:
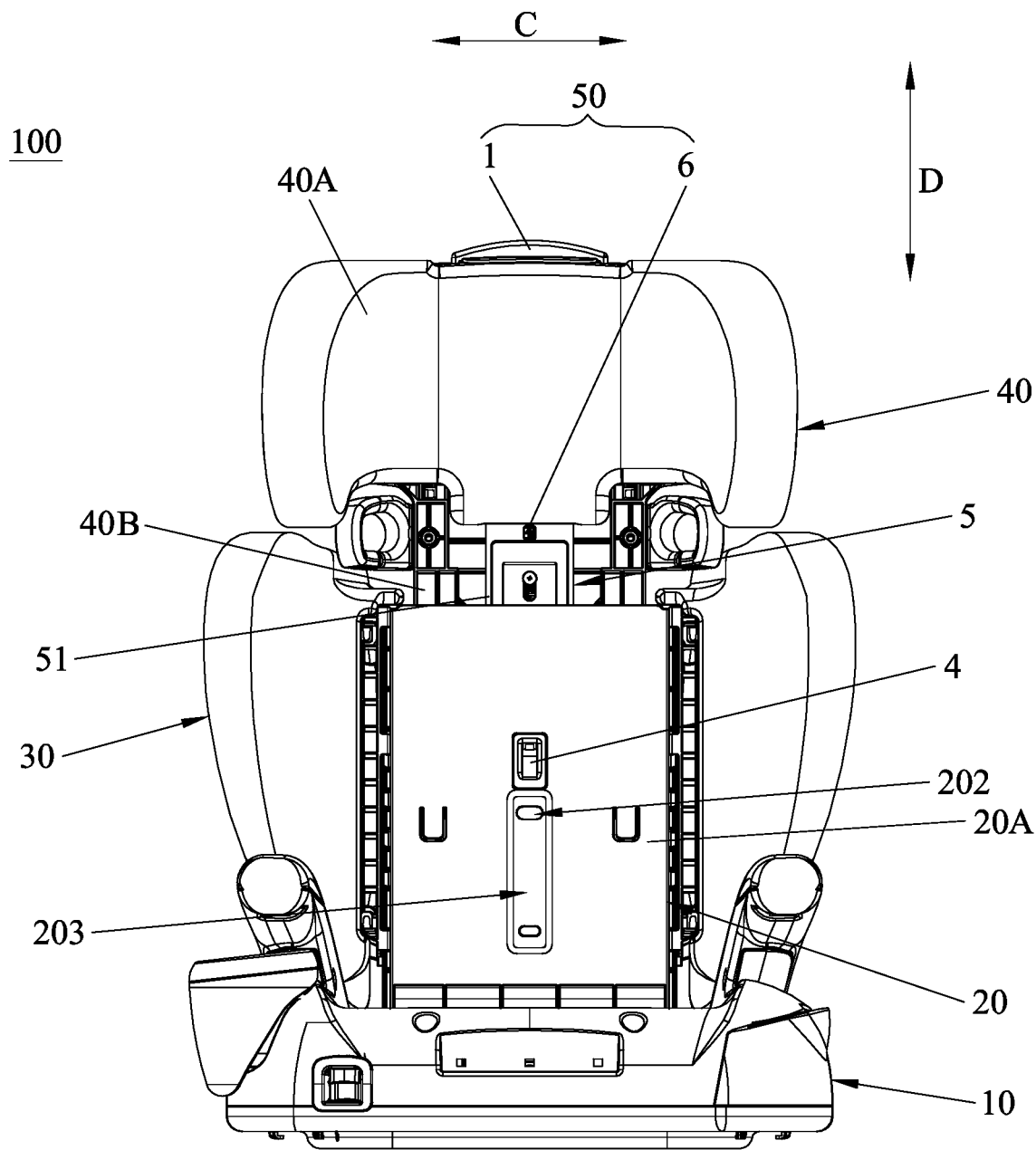
FIG. 1 is a front view illustrating an embodiment of a child safety seat.
Figure 2:
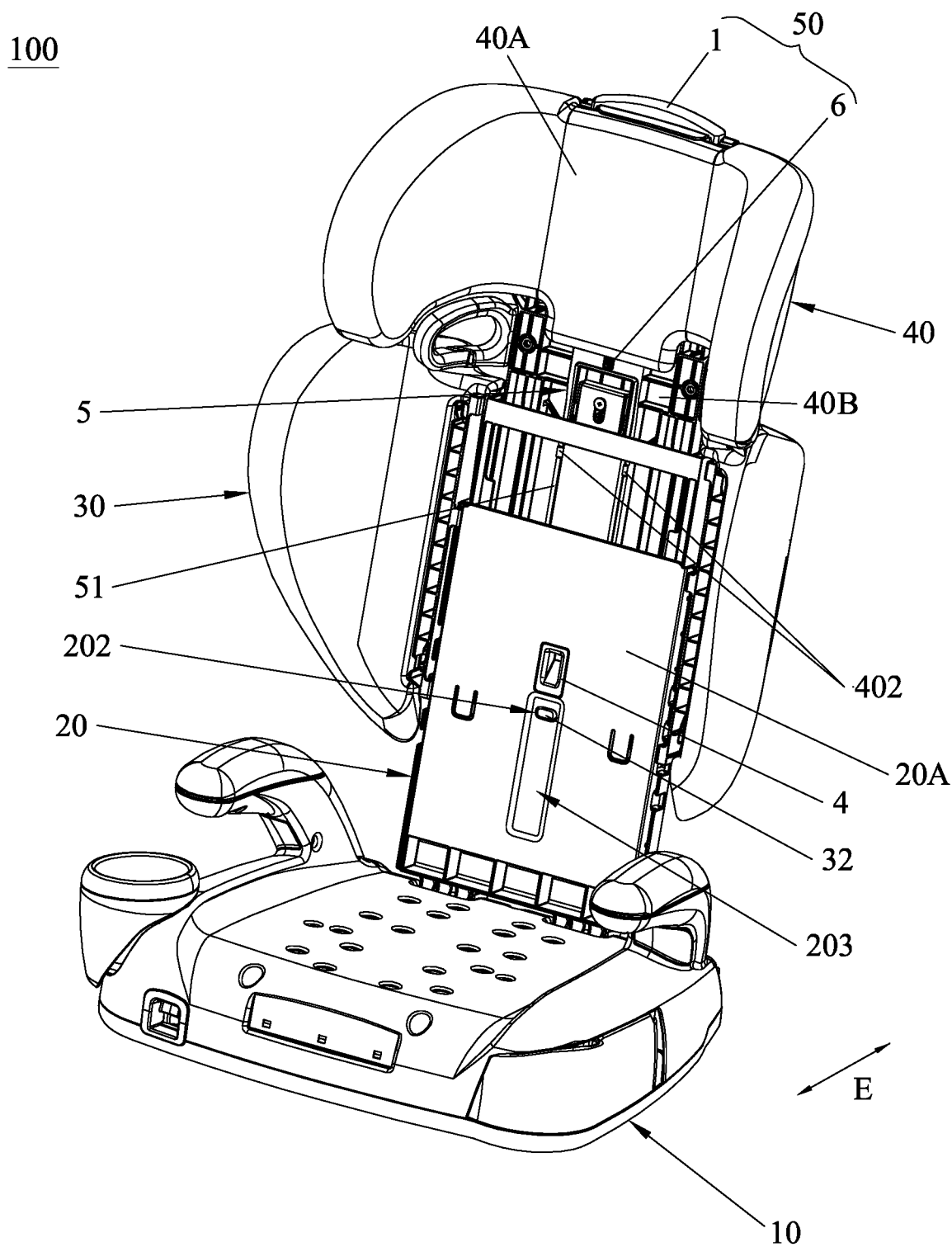
FIG. 2 is a perspective view illustrating the child safety seat.
Figure 3:
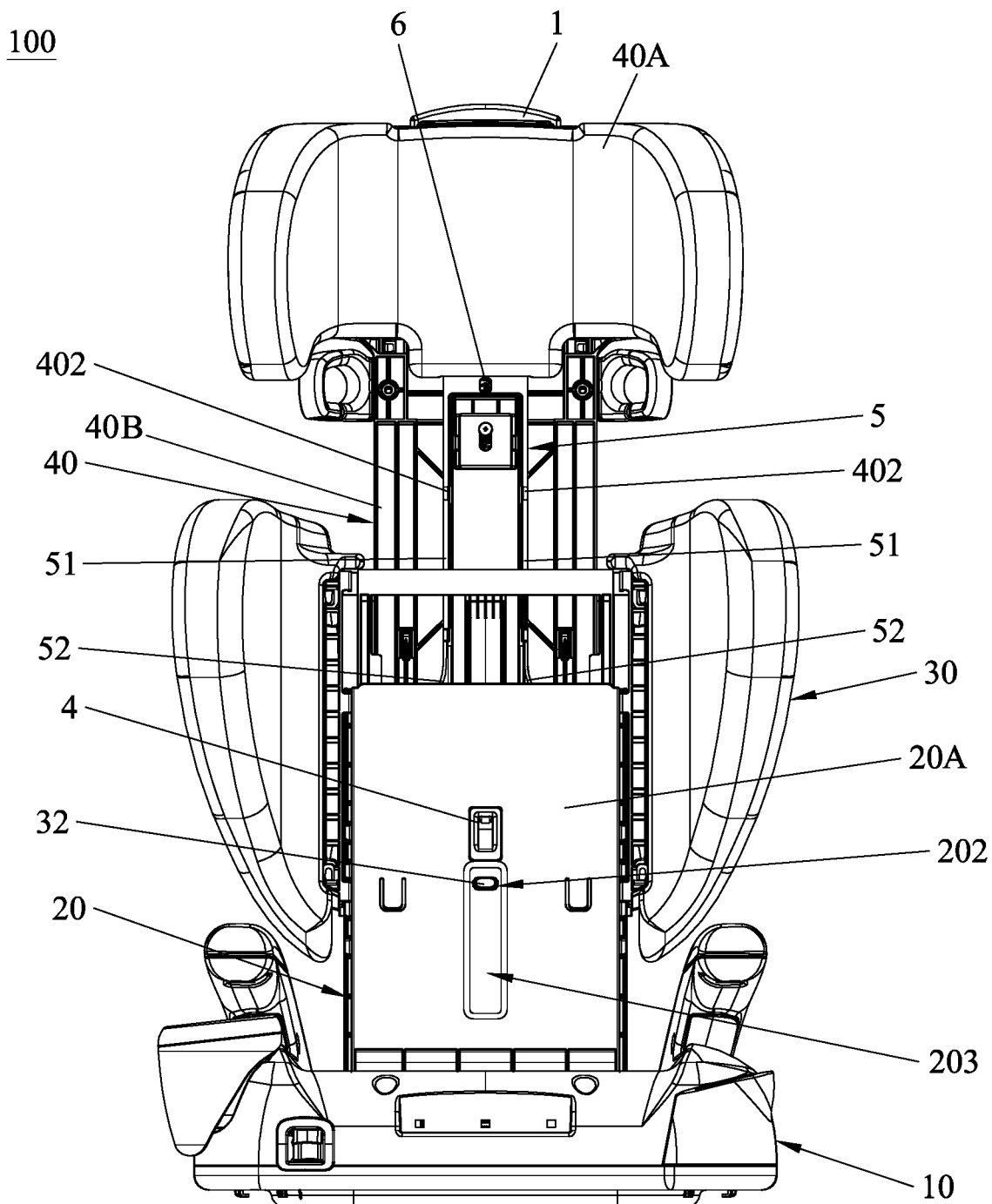
FIG. 3 is a front view illustrating the child safety seat in a first stage of height adjustment.

FIGS. 1-8 are various schematic views illustrating an embodiment of a child safety seat 100. Referring to FIGS. 1-8, the child safety seat 100 includes a seat portion 10, a backrest assembly that is connected with the seat portion 10 and includes two backrest portions 20 and 30 and a headrest 40, and a backrest adjusting system 50.

The backrest portion 20 is connected with the seat portion 10. According to an example of construction, the backrest portion 20 may be pivotally connected with the seat portion 10 about a pivot axis extending transversally (i.e., direction shown with arrow C in FIG. 1) from a left to a right side of the seat portion 10. The backrest portion 20 can thereby rotate relative to the seat portion 10 for adjustment: for example, the backrest portion 20 can be forwardly folded toward the seat portion 10 so that the overall size of the child safety seat 100 is reduced for convenient storage and/or transport. It will be appreciated that the backrest portion 20 may also be fixedly attached to the seat portion without rotational adjustability.

Figure 4:
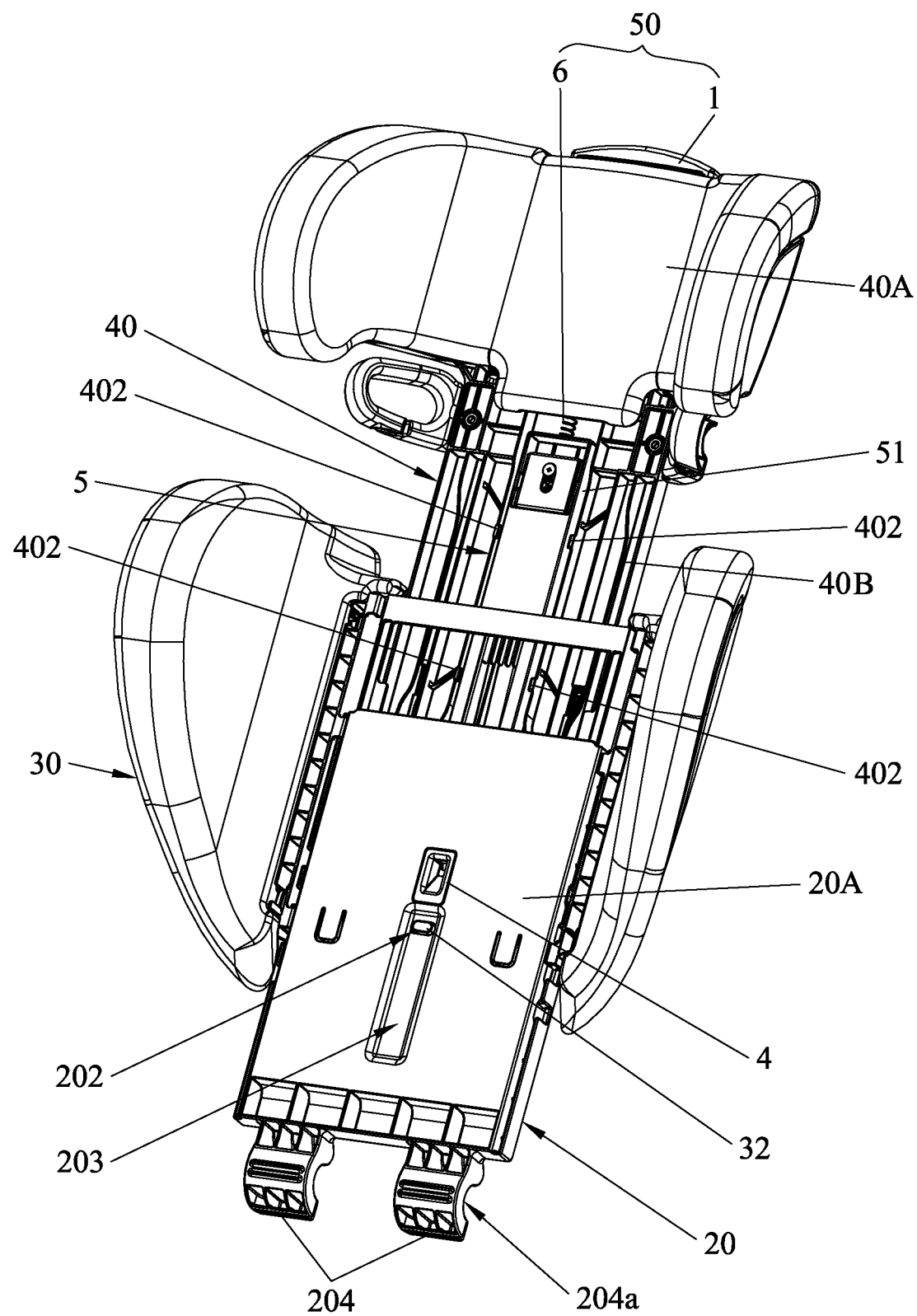
FIG. 4 is a perspective view illustrating a backrest assembly provided in the child safety seat.
Figure 5:
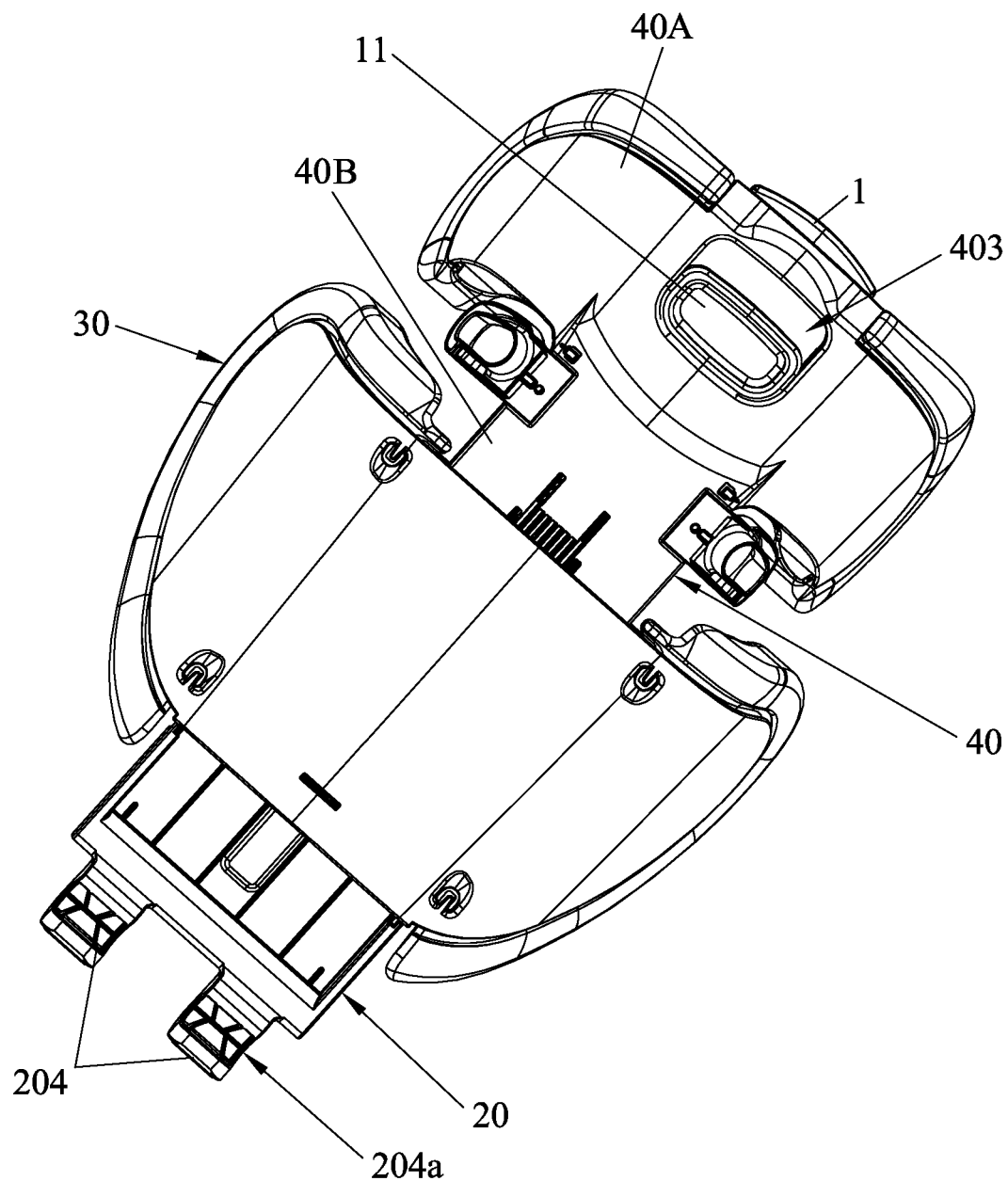
FIG. 5 is another perspective view illustrating the backrest assembly provided in the child safety seat.
Figure 6:
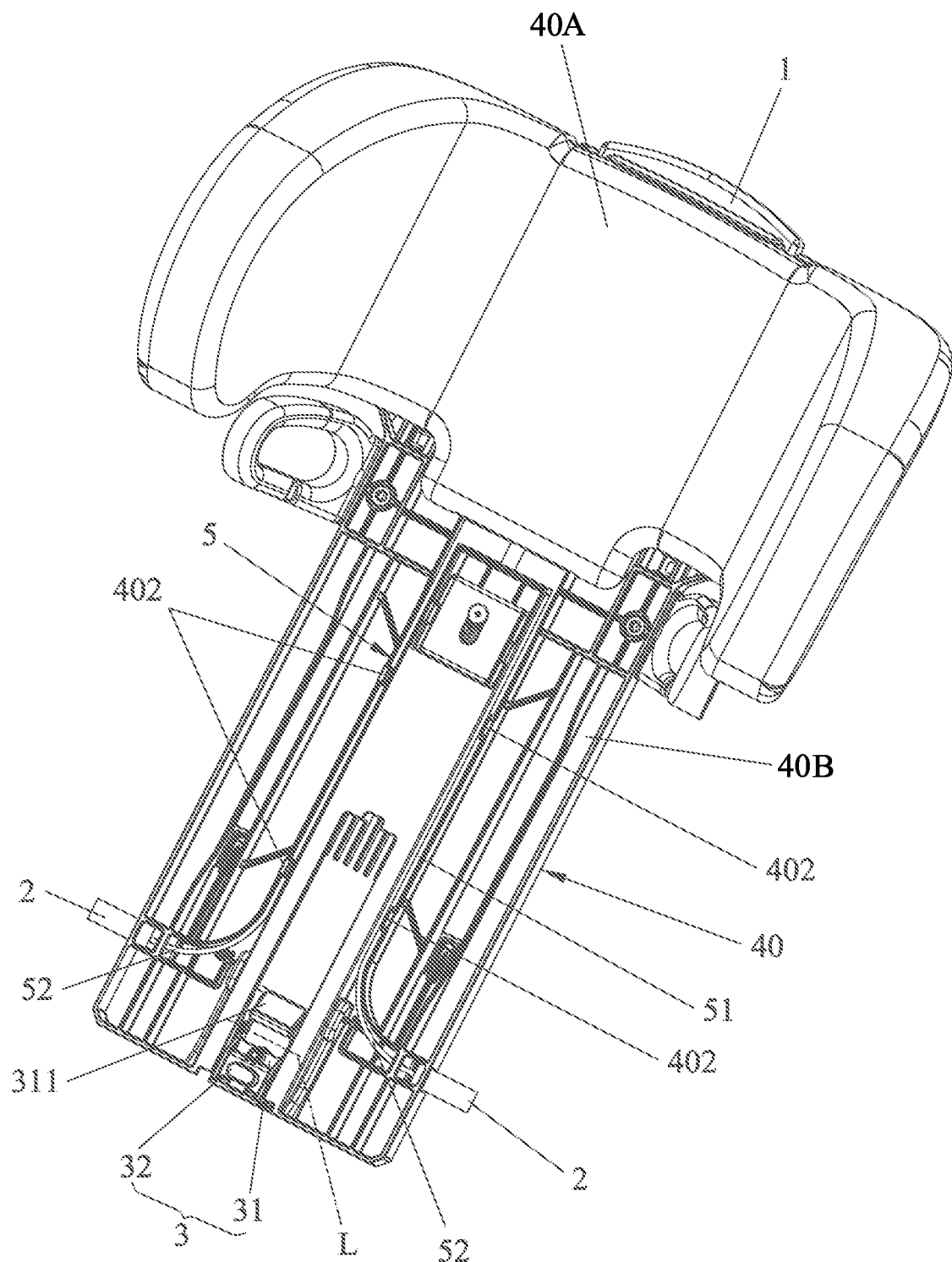
FIG. 6 is a perspective view illustrating some construction details including a headrest and a backrest adjusting system that are provided in the child safety seat.
Figure 7:
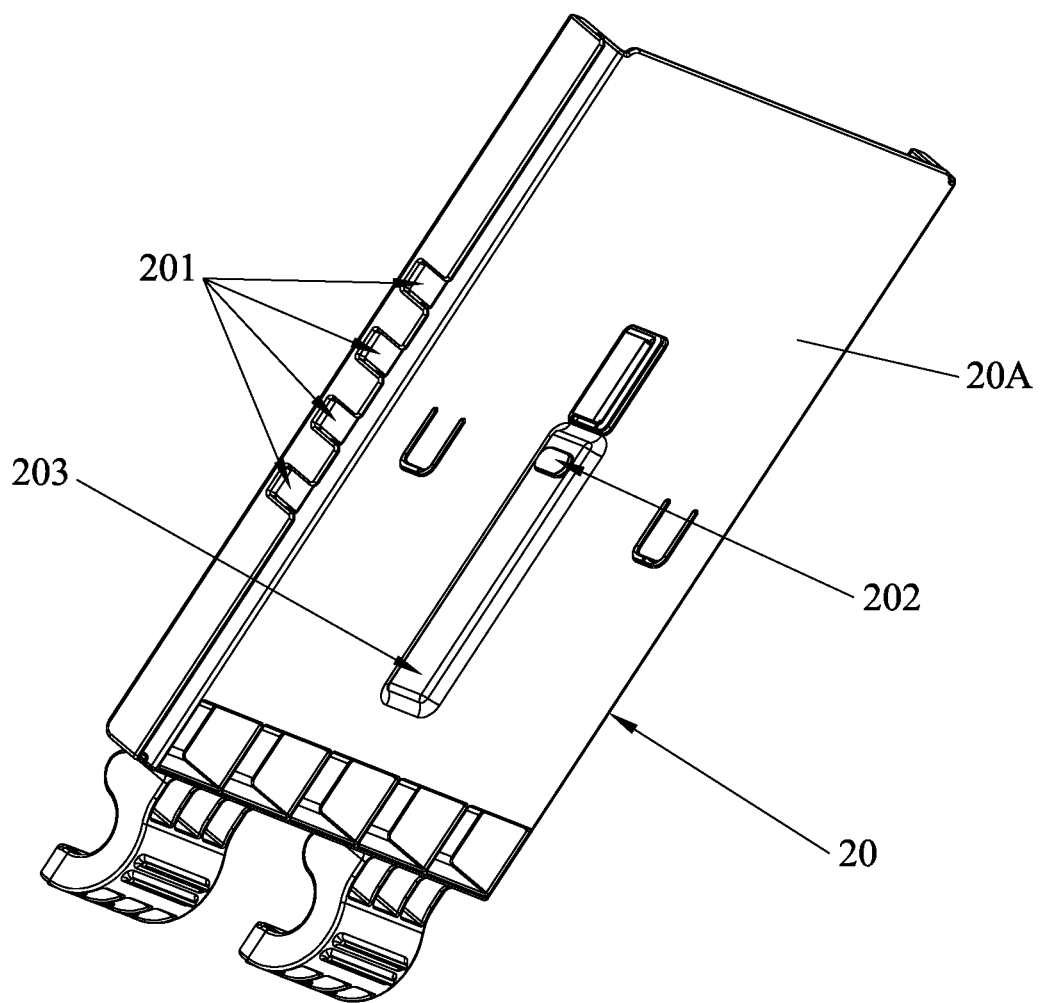
FIG. 7 is a perspective view illustrating a backrest portion provided in the child safety seat.
Figure 8:
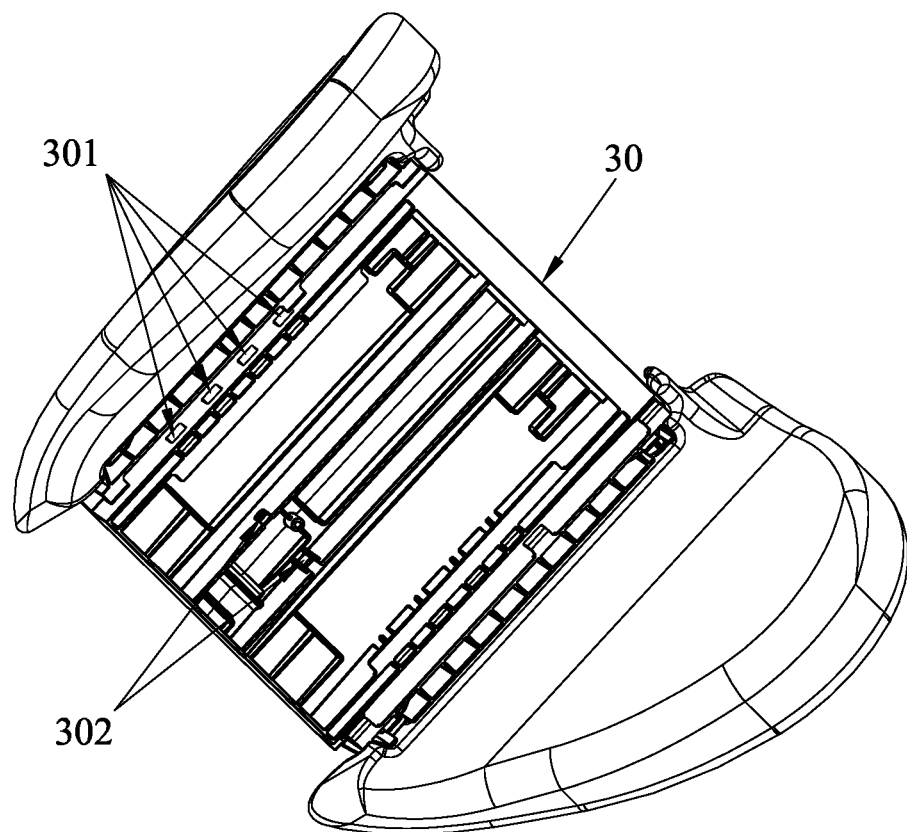
FIG. 8 is a perspective view illustrating another backrest portion provided in the child safety seat.
Figure 9:
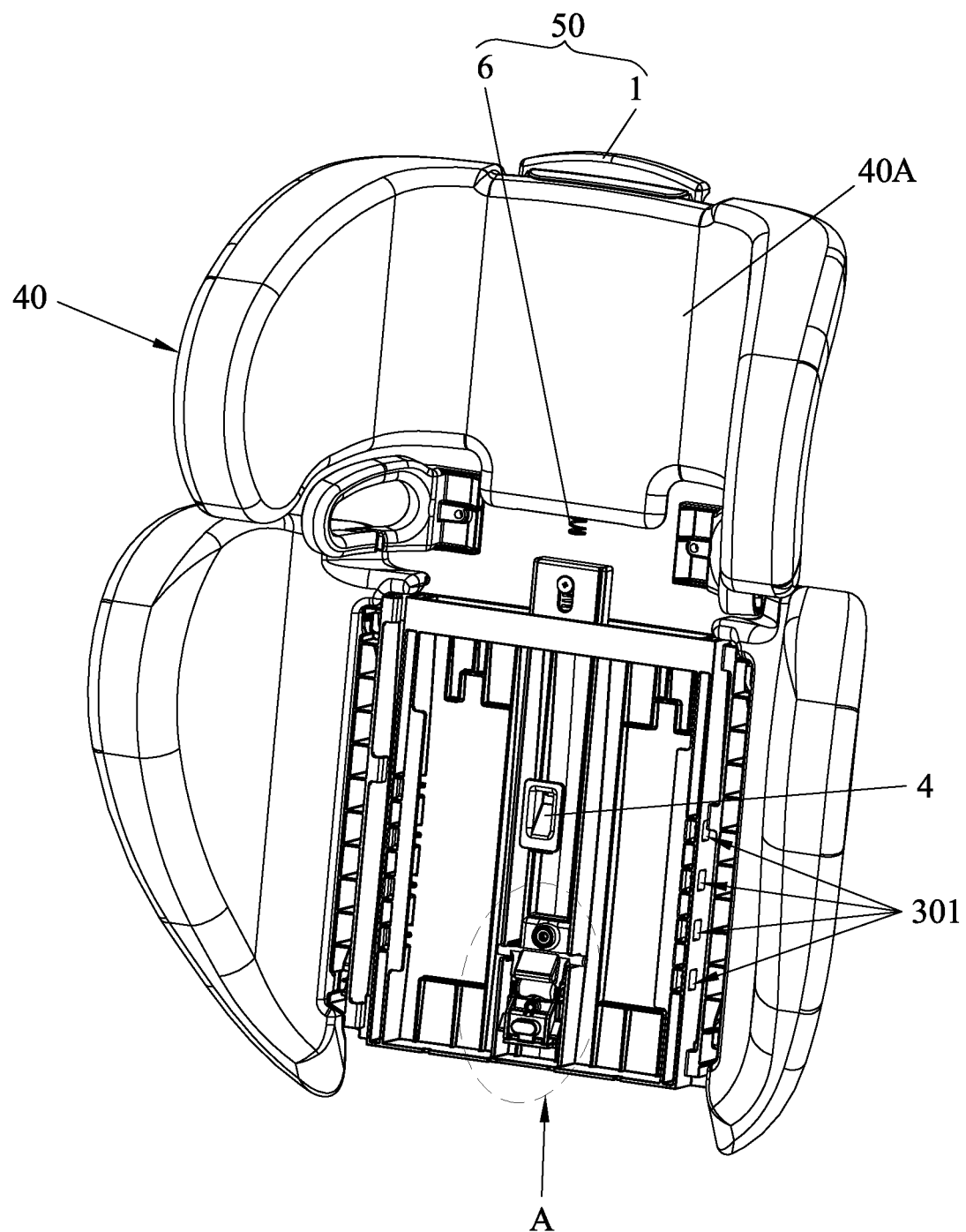
FIG. 9 is a perspective view illustrating some construction details including the backrest portion shown in FIG. 8, the headrest and a lock provided in the child safety seat.
Figure 10:
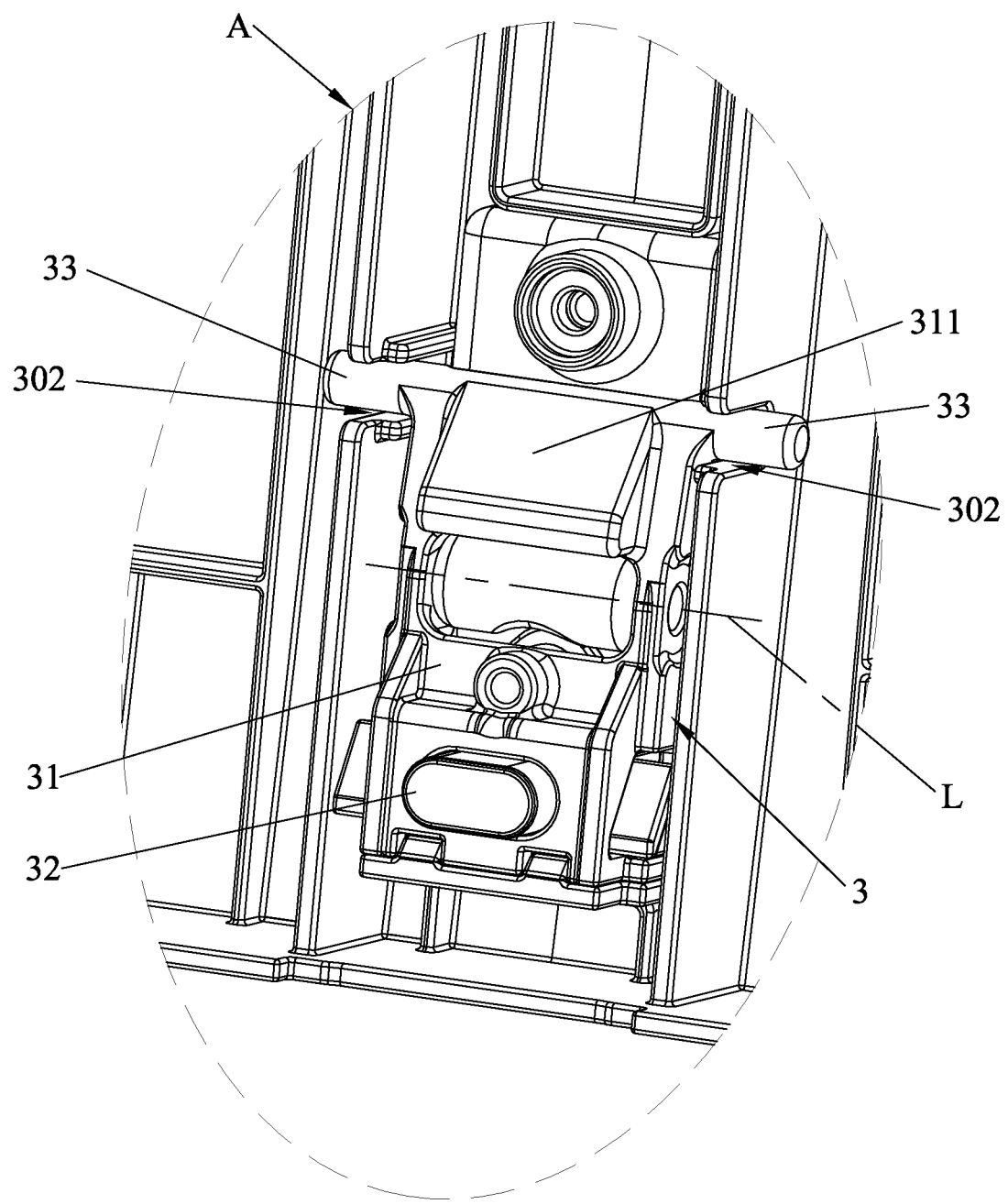
FIG. 10 is an enlarged view of portion A shown in FIG. 9.
Figure 11:
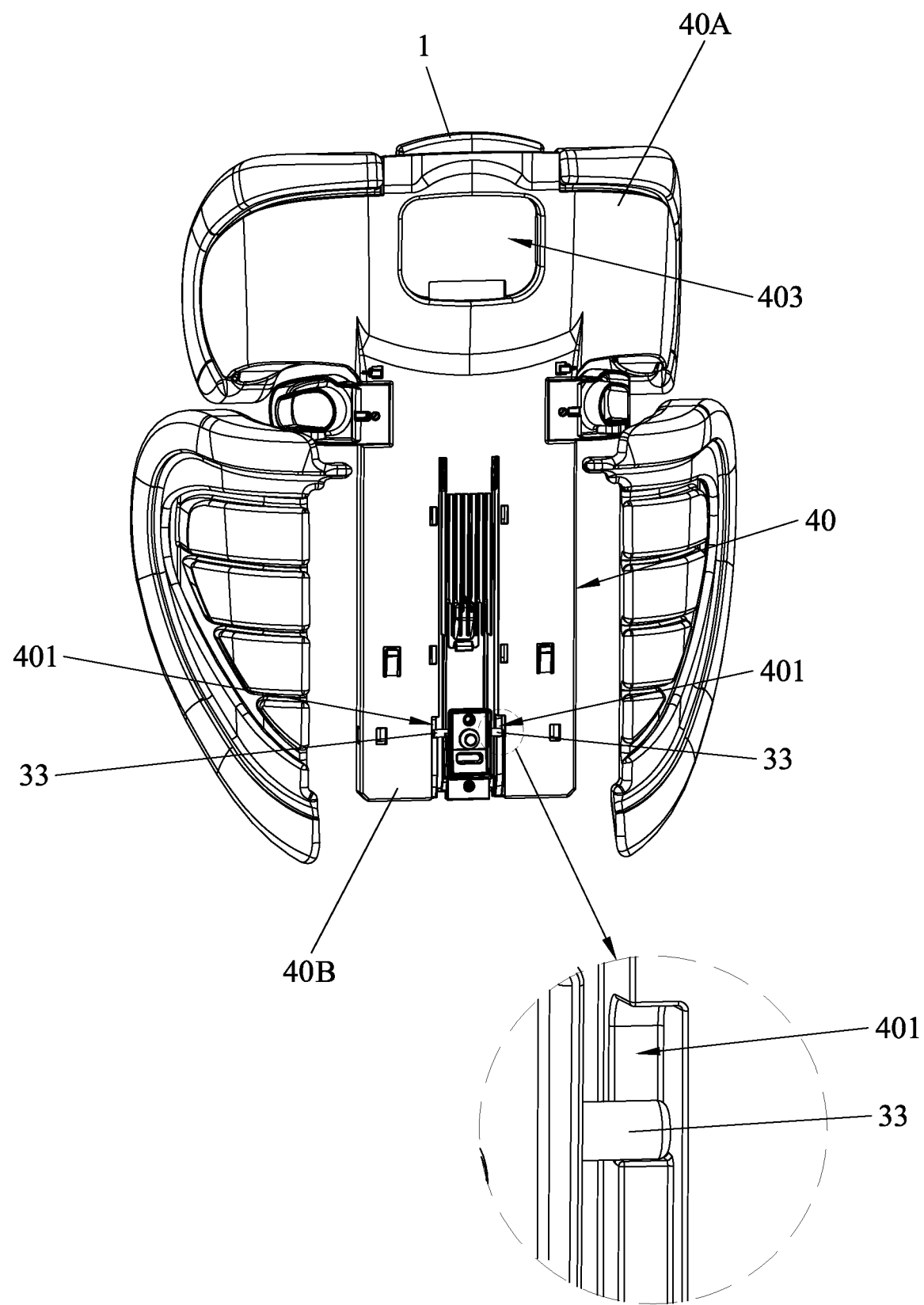
FIG. 11 is a schematic view illustrating some construction details including the lock and the headrest provided in the child safety seat.
Figure 12:
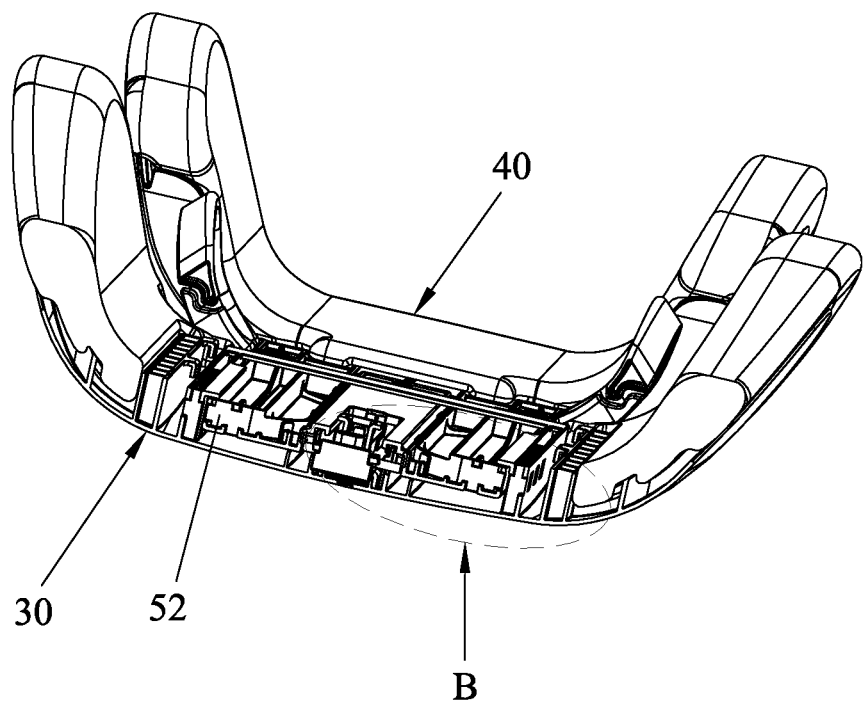
FIG. 12 is a cross-sectional view illustrating some construction details along a section plane crossing the backrest portions and the headrest of the backrest assembly.
Figure 13:
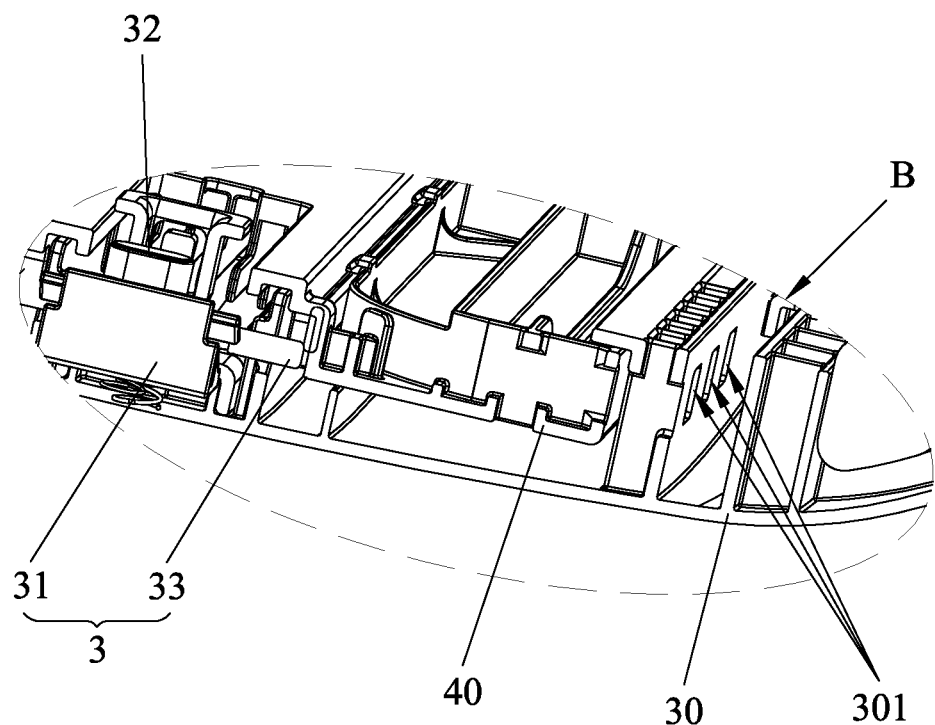
FIG. 13 is an enlarged view of portion B shown in FIG. 12.
Figure 14:
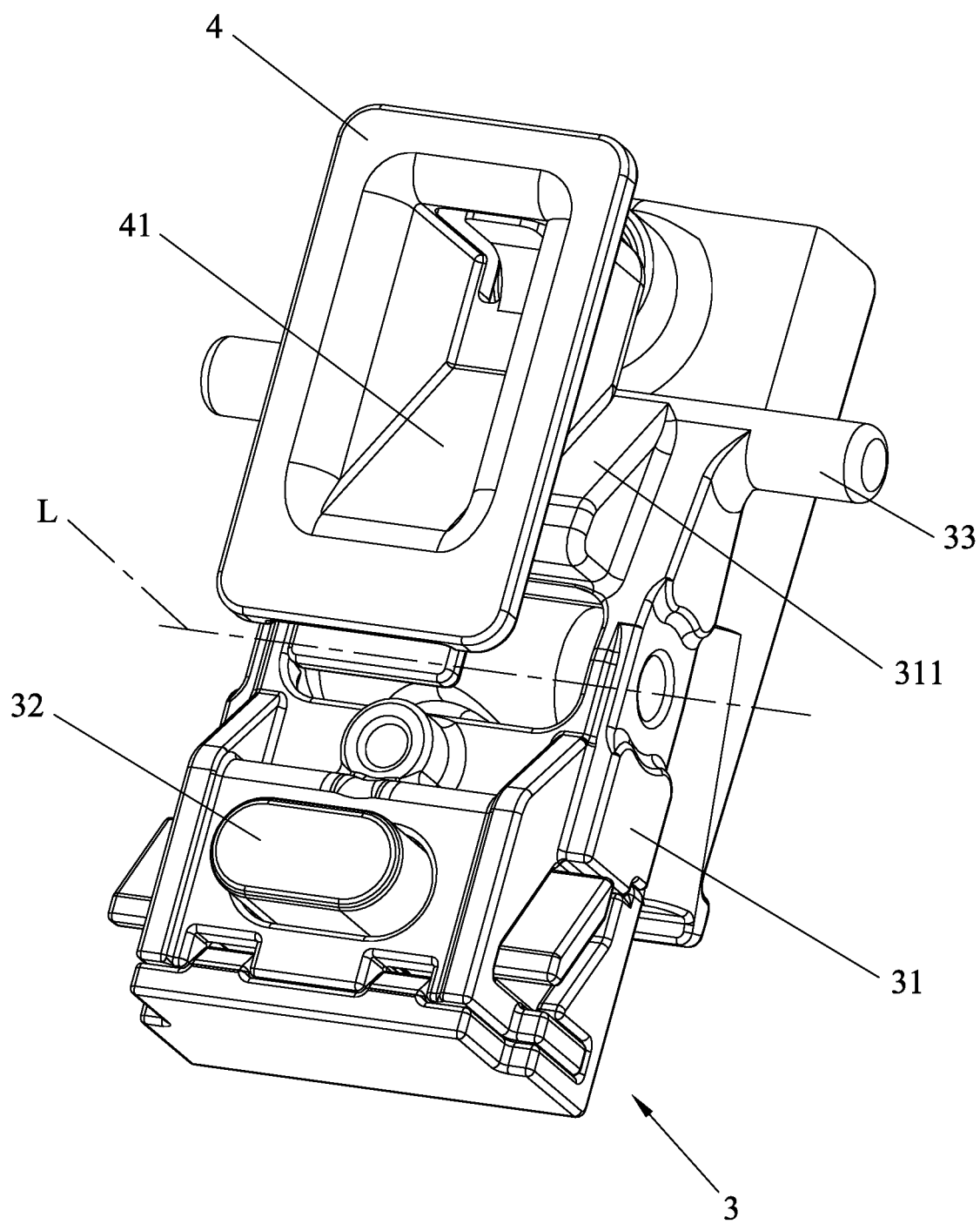
FIG. 14 is a perspective view illustrating a lock and a switching actuator of a backrest adjusting system provided in the child safety seat.

According to an example of construction, the backrest portion 20 may be fixedly attached to the seat portion 10 via a connection that is detachable or not detachable. For example, a lower end of the backrest portion 20 can include one or more catches 204 having a semicircular recess 204*a* (as shown in FIGS. 4 and 5) that can engage with a corresponding structure on the seat portion 10 for pivotally assembling the backrest portion 20 with the seat portion 10 in a detachable manner.

Referring to FIGS. 1-8, the backrest portion 30 is slidably connected with the backrest portion 20 for sliding movement along a lengthwise axis D of the backrest assembly, whereby the backrest portion 30 can be adjusted upward and downward relative to the backrest portion 20 and the seat portion 10 according to the size of a child. According to an example of construction, the backrest portions 20 and 30 may be disposed one in front of the other for a compact assembly, e.g., the backrest portion 20 be placed in front of or behind the backrest portion 30.

The headrest 40 is slidably connected with the backrest portion 30 for sliding movement along the lengthwise axis D of the backrest assembly, whereby the headrest can be adjusted upward and downward relative to the backrest portions 20 and 30 and the seat portion 10 according to the size of a child. According to an example of construction, the headrest 40 may include a head support portion 40A, and a mount panel 40B that is fixedly connected with and projects downward from the head support portion 40A, the mount panel 40B being slidably disposed through a channel provided in the backrest portion 30 for slidably assembling the headrest 40 with the backrest portion 30.

The backrest adjusting system 50 is disposed on the backrest assembly, and is configured to provide multiple stages of height adjustment. According to an embodiment, two stages of height adjustment can be provided: a first stage where the backrest portions 20 and 30 are locked with each other and cannot move relative to each other while the headrest 40 is movable relative to the backrest portions 20 and 30 for adjustment, and a second stage where the backrest portion 30 is unlocked from the backrest portion 20 and is locked with the headrest 40 so that the headrest 40 and the backrest portion 30 are movable in unison relative to the backrest portion 20 for adjustment. The first stage can exemplary correspond to a configuration where the backrest portion 30 is locked with the backrest portion 20 in a predetermined anchor position and the headrest 40 is movable relative to the backrest portions 20 and 30 for adjustment within a first height range. The second stage can exemplary correspond to a configuration where the backrest portion 30 and the headrest 40 locked with each other are movable in unison relative to the backrest portion 20 to adjust the headrest 40 within a second height range lower than the first height range.

In conjunction with FIGS. 1-8, FIGS. 9-15 are various schematic views illustrating construction details of the backrest adjusting system 50. Referring to FIGS. 1-15, the backrest adjusting system 50 can include a release actuator 1, two adjustment latches 2, a lock 3, a spring 35 and a switching actuator 4. The release actuator 1 and the two adjustment latches 2 are assembled with the headrest 40, and are movable along with the headrest 40 during adjustment of the headrest 40.

Referring to FIGS. 4-8, each of the two adjustment latches 2 can engage with any of the backrest portion 20 and the backrest portion 30 for locking the headrest 40 at a desirable height in any of the first and second stages of height adjustment, and disengage from any of the backrest portion 20 and the backrest portion 30 to unlock the headrest 40 for adjustment. According to an example of construction, the two adjustment latches 2 can be connected with the mount panel 40B of the headrest 40 for sliding transversally relative to the headrest 40, i.e., along an axis extending from a left to a right side of the headrest 40. For example, the two adjustments latches 2 can be assembled with the mount panel 40B respectively adjacent to two opposite side edges of the mount panel 40B, and are operable to slide transversally in opposite directions relative to the mount panel 40B. The two adjustment latches 2 can slide away from each other so that each adjustment latch 2 can protrude sideways from the mount panel 40B and engage with any of the backrest portion 20 and the backrest portion 30 for locking the headrest 40 in position, and can slide toward each other to disengage from any of the backrest portion 20 and the backrest portion 30 and thereby unlock the headrest 40 for adjustment.

Referring to FIGS. 1 and 4-8, the backrest portion 30 can include a plurality of height locking sites 301 associated with the first stage of height adjustment of the backrest assembly. The height locking sites 301 may exemplary include openings, recesses, slots or the like, and may be disposed in two symmetric rows parallel to the lengthwise axis D at a left and a right side of the backrest portion 30. When the headrest is assembled with the backrest portion 30, the mount panel 40B of the headrest 40 is disposed between the two rows of the height locking sites 301. The number of height locking sites 301 provided at each of the left and right side of the backrest portion 30 may vary depending on the desirable number of settable positions for the first stage of height adjustment. For example, each of the left and right side of the backrest portion 30 may respectively include 2, 3, 4, 5 or more height locking sites 301 so that the first stage of height adjustment may correspondingly include 2, 3, 4, 5 or more settable positions. The headrest 40 may be locked in any of the settable positions in the first stage of height adjustment by engaging each adjustment latch 2 with a corresponding one of the height locking sites 301. For example, the two adjustment latches 2 can slide away from each other so that each adjustment latch 2 can protrude sideways from the mount panel 40B of the headrest 40 and engage with a corresponding one of the height locking sites 301 for locking the headrest 40 in position, and can slide toward each other to disengage from the height locking sites 301 and thereby unlock the headrest 40 for adjustment.

The backrest portion 20 can include a plurality of height locking sites 201 associated with the second stage of height adjustment of the backrest assembly. The height locking sites 201 may exemplary include openings, recesses, slots or the like, and may be disposed in two symmetric rows parallel to the lengthwise axis D at a left and a right side of the backrest portion 20. The number of height locking sites 201 provided at each of the left and right side of the backrest portion 20 may vary depending on the desirable number of settable positions for the second stage of height adjustment. For example, each of the left and right side of the backrest portion 20 may respectively include 2, 3, 4, 5 or more height locking sites 201 so that the second stage of height adjustment may correspondingly include 2, 3, 4, 5 or more settable positions. The headrest 40 may be locked in any of the settable positions in the second stage of height adjustment by engaging each adjustment latch 2 with a corresponding one of the height locking sites 201. For example, the two adjustment latches 2 can slide away from each other so that each adjustment latch 2 can protrude sideways from the mount panel 40B of the headrest and engage with a corresponding one of the height locking sites 201 for locking the headrest 40 and the backrest portion 30 in position, and can slide toward each other to disengage from the height locking sites 201 and thereby unlock the headrest 40 and the backrest portion 30 for adjustment.

The two row regions of the height locking sites 201 on the backrest portion 20 may overlap at least partially with the two row regions of the height locking sites 301 on the backrest portion 30 when the backrest portion 30 moves in the second stage of height adjustment. According to an example of construction, the two rows of the height locking sites 201 may be located between the two rows of the height locking sites 301 in the second stage of height adjustment, and the two adjustment latches 2 may also respectively engage with two ones of the height locking sites 301 (e.g., the lowest ones) on the backrest portion 30 when the headrest 40 and the backrest portion 30 are locked in any positions in the second stage of height adjustment.

Referring to FIGS. 1-6, the release actuator 1 is movably coupled to the two adjustment latches 2, whereby the release actuator 1 is operable to urge the adjustment latches 2 in movements for unlocking the headrest 40. According to an example of construction, the release actuator 1 can be respectively coupled to the two adjustment latches 2 via two linking members 5. Each linking member 5 can have an elongate shape respectively affixed to one adjustment latch 2 and the release actuator 1 at two opposite ends, whereby the release actuator 1, the linking members 5 and the two adjustment latches 2 are movable in unison during operation.

According to an example of construction, the release actuator 1 may be provided as a handle, and may be disposed at a central region of the headrest 40, e.g., at a central region adjacent to a top of the head support portion 40A. The release actuator 1 can be slidably connected with the headrest 40 for sliding movements along the lengthwise axis D of the backrest assembly. Each linking member 5 connecting the release actuator 1 to one adjustment latch 2 can include a curved shape and can be elastically deformable. For example, each linking member 5 can include a first portion 51 that extends generally parallel to the lengthwise axis D of the backrest assembly and upwardly connects with the release actuator 1, and a second portion 52 having a curved shape that connects with one adjustment latch 2. The headrest 40 may further include a guiding structure 402 configured to guide sliding movements of the linking members 5 during operation. For example, the guiding structure 402 may include ribs and/or slots provided on the mount panel 40B that are in sliding contact with the linking members 5. Once assembled, the adjustment latches 2 and the linking members 5 may be at least partially concealed between the mount panel 40B of the headrest 40 and the backrest portion 20.

With the aforementioned construction, the release actuator 1, the adjustment latches 2 and the linking members 5 are linked with one another, and are movable in unison for locking and unlocking the headrest 40. For example, the release actuator 1 can slide downward when the two adjustment latches 2 slide away from each other to engage with the backrest portion 20 and/or the backrest portion 30 for locking the headrest 40, and the release actuator 1 can be pulled upward to draw the two adjustment latches 2 to slide toward each other and disengage from the backrest portion 20 and/or the backrest portion 30 for unlocking the headrest 40.

Referring to FIGS. 1-4, the backrest adjusting system 50 can further include a spring 6 configured to apply a biasing force for urging the adjustment latches 2 toward a locking state in engagement with any of the backrest portion 20 and the backrest portion 30. For example, the spring 6 can be respectively connected with the release actuator 1 and the headrest 40, and can apply a downward biasing force on the release actuator 1.

Referring to FIG. 5, the release actuator 1 may include a protrusion 11 that is restricted to slide within a limiting slot 403 provided on the headrest 40 (e.g., on the head support portion 40A of the headrest 40) for limiting the course of the release actuator 1 and the two adjustment latches 2. For example, the travel of the release actuator 1 and the two adjustment latches 2 in an unlocking direction may be stopped by a contact between the protrusion 11 and an upper end of the limiting slot 403, and the travel of the release actuator 1 and the two adjustment latches 2 in a locking direction may be stopped by a contact between the protrusion 11 and a lower end of the limiting slot 403.

Referring to FIGS. 1-15, the lock 3 is assembled with the backrest portion 30, and can be operable independently of the release actuator 1 and the adjustment latches 2. More specifically, the lock 3 is movable along with the backrest portion 30, and can have two locking states: a first locking state where the lock 3 is engaged with the backrest portion 20 and disengaged from the headrest 40 corresponding to the first stage of height adjustment, and a second locking state where the lock 3 is engaged with the headrest 40 and disengaged from the backrest portion 20 corresponding to the second stage of height adjustment. According to an example of construction, the lock 3 can include two latching parts 31 and 32 and a spring 34, the latching part 31 being provided for locking engagement with the headrest 40, and the latching part 32 being provided for locking engagement with the backrest portion 20. The lock 3 may be exemplary disposed in a central region of the backrest portion 30 that extends between the two rows of the height locking sites 301, e.g., the lock 3 may be disposed centrally and close to a lower transversal edge of the backrest portion 30.

Referring to FIGS. 9-15, the latching part 31 can unlock the headrest 40 from the backrest portion 30 when the lock 3 is in the first locking state corresponding to the first stage of height adjustment, and can lock the headrest 40 with the backrest portion 30 when the lock 3 is in the second locking state corresponding to the second stage of height adjustment. According to an example of construction, the latching part 31 can be disposed in a central region of the backrest portion 30 between the two rows of the height locking sites 301. According to an example of construction, the latching part 31 can be pivotally connected with the backrest portion 30 about a pivot axis L extending transversally relative to the backrest portion 30, and can include two side protrusions 33 eccentric from the pivot axis L that protrude from two opposite sides of the latching part 31. The side protrusions 33 can be fixedly connected with the latching part 31. For example, the latching part 31 including the side protrusions 33 may be formed integrally as a single part. The latching part 31 can rotate about the pivot axis L in a first direction to respectively engage the two side protrusions 33 with two anchoring portions 401 provided on the headrest 40 for locking the headrest 40 with the backrest portion 30, and can rotate in a second direction opposite to the first direction to respectively disengage the two side protrusions 33 from the two anchoring portions 401 for unlocking the headrest 40 from the backrest portion 30.

According to an example of construction, the two anchoring portions 401 can be provided on the mount panel 40B of the headrest 40, and can be grooves, slots, recesses or the like. For example, each anchoring portion 401 may be a curved slot that has a center of curvature on the pivot axis L of the latching part 31 and is adapted to receive the engagement of a corresponding side protrusion 33. The latching part 31 can exemplary rotate in a first direction to displace the two side protrusions 33 forward for engagement with the two anchoring portions 401 of the headrest 40, and can rotate in a second direction opposite to the first direction to displace the two side protrusions 33 rearward for disengagement from the two anchoring portions 401 of the headrest 40. The backrest portion 30 may include two receiving slots 302 (better shown in FIGS. 8 and 10) adapted to receive the two side protrusions 33 when the latching part 31 is fully disengaged from the headrest 40, which can ensure proper placement of the latching part 31 when the lock is in the first locking state. For example, each receiving slot 302 may be a curved slot that has a center of curvature on the pivot axis L of the latching part 31.

Referring to FIGS. 1-4, 6, 7 and 9-15, the latching part 32 can lock the backrest portion 30 with the backrest portion 20 when the lock 3 is in the first locking state corresponding to the first stage of height adjustment, and can unlock the backrest portion from the backrest portion 20 when the lock 3 is in the second locking state corresponding to the second stage of height adjustment. According to an example of construction, the latching part 32 can be carried by the latching part 31, so that the latching parts 31 and 32 may move in unison during a rotation of the latching part 31 about the pivot axis L. For example, the latching part 32 and the side protrusions 33 may be placed at two opposite sides of the latching part 31 relative to the pivot axis L, whereby the latching part 31 may be rotatable to concurrently displace the latching part 32 and the side protrusions 33 in opposite directions.

Moreover, the latching part 32 can be movably connected with the latching part 31 so as to allow relative movement between the latching parts 31 and 32. For example, the latching part 32 can be slidably connected with the latching part 31 for sliding along a front-rear axis E (better shown in FIG. 2) of the backrest portion 30. The latching part 32 can thereby slide relative to the latching part 31 between a first position where an abutting portion 321 of the latching part 32 (better shown in FIG. 15) can contact with or lie adjacent to without contacting an abutting portion 311 of the latching part 31 (better shown in FIG. 15), and a second position where the abutting portion 321 is displaced away from the abutting portion 311. According to an example of construction, the latching part 32 can have a protuberant portion 32A (better shown in FIG. 15) that can project forward at a front of the latching part 31 to facilitate locking engagement with the backrest portion 20 when the latching part 32 is in the first position relative to the latching part 31. The spring 34 is respectively connected with the latching parts 31 and 32, and can bias the latching part 32 toward the first position adapted to provide locking engagement.

With the aforementioned construction, the latching part 32 can move in one direction to engage with an anchoring portion 202 provided on the backrest portion 20 for locking the backrest portion 30 with the backrest portion 20, and can move in an opposite direction to disengage from the anchoring portion 202 for unlocking the backrest portion 30 from the backrest portion 20. For example, a rotation of the latching part 31 for disengaging the side protrusions 33 and unlocking the headrest 40 can displace the latching part 32 in one direction for engagement with the anchoring portion 202 of the backrest portion 20, and an external force can be applied on the latching part 32 to cause the latching part 32 to move relative to the latching part 31 in an opposite direction for disengaging from the anchoring portion 202 of the backrest portion 20. The spring 34 can be compressed when the latching part 32 moves for disengaging from the anchoring portion 202 of the backrest portion 20.

According to an example of construction, the anchoring portion 202 can include an opening provided on a front wall 20A of the backrest portion 20, and the protuberant portion 32A of the latching part 32 can engage with the anchoring portion for locking the backrest portion 30 with the backrest portion 20. The anchoring portion 202 may be exemplary disposed in a central region on the front wall 20A of the backrest portion 20. More specifically, the anchoring portion 202 may be exemplary disposed in a recessed region 203 of the front wall 20A (better shown in FIGS. 1-4) having a suitable depth so that the latching part 32 (in particular, the protuberant portion 32A thereof) engaged with the anchoring portion 202 would not protrude outward from a major surface of the front wall 20A. This may prevent a child resting against the backrest assembly from feeling discomfort when the latching part 32 is engaged with the anchoring portion 202 of the backrest portion 20. With the aforementioned placement of the anchoring portion 202 on the front wall 20A of the backrest portion 20, the latching part can exemplary move forward to engage the protuberant portion 32A with the anchoring portion 202 of the backrest portion 20 for locking the backrest portion 30 with the backrest portion 20, and can move rearward to disengage the protuberant portion 32A from the anchoring portion 202 of the backrest portion 20 for unlocking the backrest portion 30 from the backrest portion 20. For unlocking the backrest portion 30 from the backrest portion 20, a caregiver can press the protuberant portion 32A exposed through the anchoring portion 202 at the front of the backrest portion 20 so as to cause the latching part 32 to slide relative to the latching part 31 and disengage from the anchoring portion of the backrest portion 20.

Figure 15:
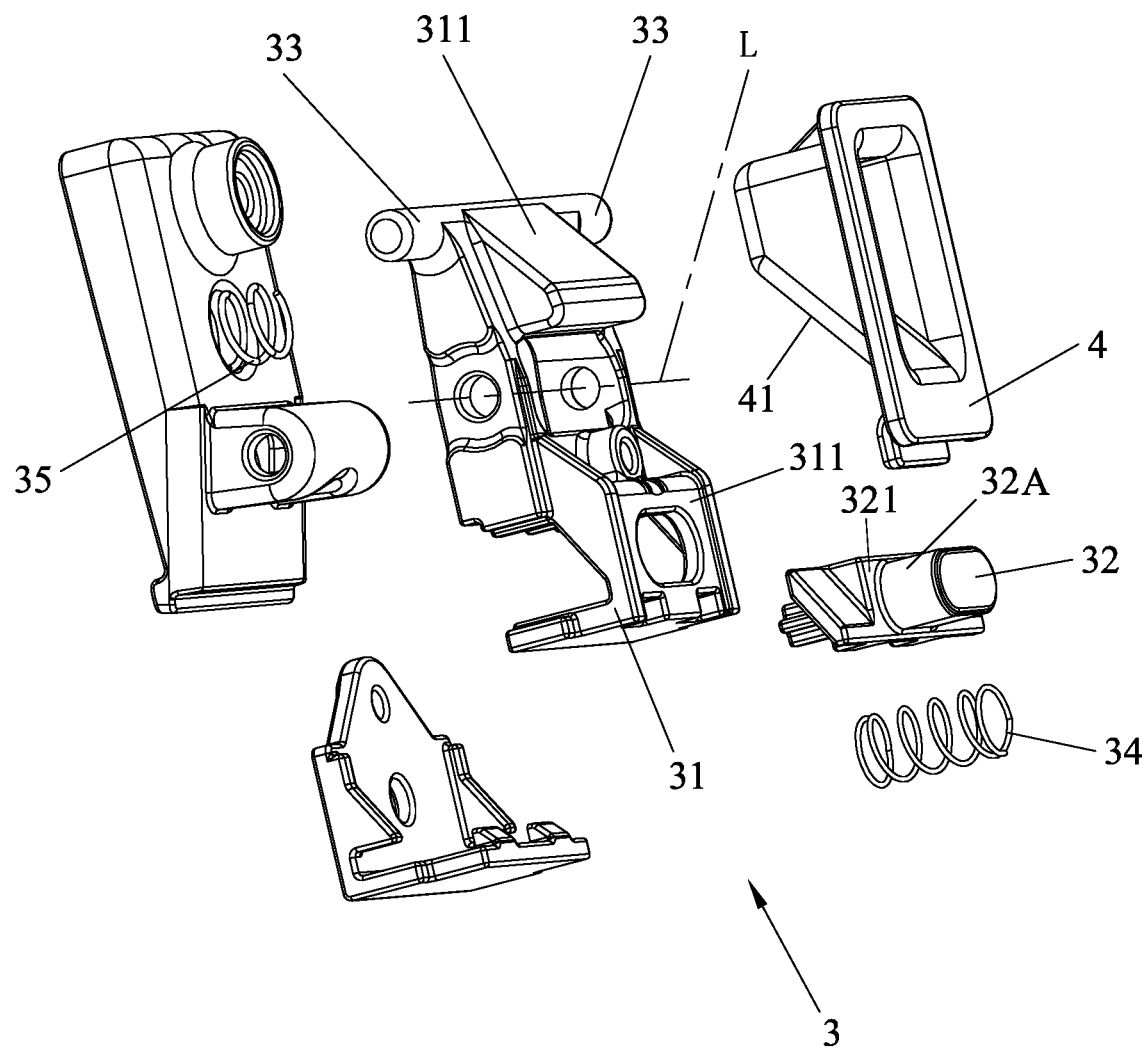
FIG. 15 is an exploded view illustrating construction details of the lock and the switching actuator.

Referring to FIG. 15, the spring 35 is configured to bias the lock 3 toward the second locking state. According to an example of construction, the spring 35 can be respectively connected with the latching part 31 and the backrest portion 30, and is arranged to bias the latching part 31 to rotate about the pivot axis L for engagement with the headrest 40. The spring 35 may be compressed when the lock 3 is in the first locking state.

Referring to FIGS. 1-4 and 9-15, the switching actuator 4 is operable to cause the lock 3 to switch from the second locking state (i.e., wherein the backrest portion 30 is locked with the headrest 40 and unlocked from the backrest portion 20) to the first locking state (i.e., wherein the backrest portion 30 is unlocked from the headrest 40 and locked with the backrest portion 20) when a movement of the backrest portion 30 and the headrest 40 locked with each other moves the backrest portion 30 to a predetermined anchor position relative to the backrest portion 20. According to an embodiment, the switching actuator 4 can be configured to contact and urge the latching part 31 to move and disengage from the headrest 40 so that the latching part 32 can engage with the backrest portion 20, when a movement of the backrest portion 30 and the headrest 40 locked with each other by the latching part 31 moves the backrest portion 30 to the anchor position relative to the backrest portion 20.

According to an example of implementation, the anchor position of the backrest portion 30 relative to the backrest portion 20 may correspond to a most extended position of the backrest portion 30 relative to the backrest portion 20, which may be exemplary when the backrest portion 30 is at a highest position relative to the backrest portion 20 with the adjustment latch 2 on each of the and right side located above or at the same level as a highest one of the height locking sites 201 on the backrest portion 20. However, it will be appreciated that the anchor position of the backrest portion 30 relative to the backrest portion 20 may be set at other locations. For example, the anchor position of the backrest portion 30 relative to the backrest portion 20 may be any lower position where the adjustment latch 2 on each of the and right side is located above or at the same level as any height locking site 201 that is higher than the lowest height locking site 201 and lower than the highest height locking site 201 on the backrest portion 20.

According to an example of construction, the switching actuator 4 can be fixedly connected with the backrest portion 20, and the lock 3 can move toward or away from the switching actuator 4 when the backrest portion 30 slides relative to the backrest portion 20 in the second stage of height adjustment. The switching actuator 4 may be a single part fixedly attached to the backrest portion 20, or may be a part integrally formed with the backrest portion 20. As the backrest portion 30 locked with the headrest 40 by the latching part 31 slides upward and reaches the anchor position relative to the backrest portion 20, the switching actuator 4 can contact and urge the lock 3 to switch from the second locking state to the first locking state. More specifically, the switching actuator 4 can contact and urge the latching part 31 to rotate for disengaging the side protrusions 33 from the anchoring portions 401 of the headrest 40 and for engaging the latching part 32 with the anchoring portion 202 of the backrest portion 20. For example, a ramp surface provided on the switching actuator 4 may contact and push against a ramp surface 311 provided on the latching part 31 to urge the latching part 31 in rotation for disengaging from the headrest 40 as the backrest portion 30 slides upward and reaches the anchor position.

Exemplary operation of the backrest adjusting system 50 is described hereinafter with reference to FIGS. 1-15. Suppose that the backrest assembly is in the first stage of height adjustment. The lock 3 is in the first locking state, and the backrest portions 20 and 30 are locked with each other by the engagement of the latching part 32 with the anchoring portion 202 of the backrest portion 20 while the headrest 40 is unlocked from the backrest portion 30. In this first stage of height adjustment, the backrest portions 20 and 30 are not movable relative to each other and are affixed to the seat portion 10, and the headrest 40 can slide upward or downward relative to the backrest portions 20 and 30 for adjusting the headrest 40 within a first height range. Once the headrest 40 reaches a desired position, the adjustment latches 2 can engage with two corresponding ones of the height locking sites 301 on the backrest portion 30 for locking the headrest 40 in position.

When the backrest assembly is to be switched from the first stage of height adjustment to the second stage of height adjustment for adjusting the headrest 40 within the second height range lower than the first height range, a caregiver can operate the release actuator 1 to cause the adjustment latches 2 to disengage from the backrest portion 30, which thereby unlocks the headrest 40 from the backrest portion 30. While the backrest portions 20 and 30 are locked with each other by the latching part 32 and remain stationary, the unlocked headrest 40 then can be moved downward until the headrest 40 reaches a proper position relative to the backrest portion 30 and the lock 3 that enables locking engagement of the lock 3 with the anchoring portions 401 of the headrest 40. This proper position may be, for example, a lowest position of the headrest 40 relative to the backrest portion 30 corresponding to the lowest ones of the height locking sites 301. Once the headrest 40 is in the proper position relative to the backrest portion 30, the caregiver can release the release actuator 1 so that the adjustment latches 2 can engage with the corresponding ones of the height locking sites 301 so as to lock the headrest 40 with the backrest portion 30. Then the protuberant part 32A can be pressed inward so as to cause the latching part 32 to slide relative to the latching part 31 and the backrest portion 30 and disengage from the anchoring portion 202 of the backrest portion 20, whereby the backrest portions 20 and 30 are unlocked from each other. As the latching part 32 moves to disengage from the backrest portion 20, the abutting portion 321 of the latching part can move away from the abutting portion 311 of the latching part 31. Subsequently, the headrest 40 and the backrest portion 30 locked with each other by the adjustment latches 2 can move downward in unison relative to the backrest portion 20, which also causes the latching part 31 to move downward along with the backrest portion 30. As a result, the latching part 31 can move away and disengage from the switching actuator 4, and can rotate and engage with the anchoring portions 401 of the headrest 40 owing to the biasing force applied by the spring 35. The lock 3 can be thereby switched to the second locking state, and the backrest portion 30 and the headrest 40 can be locked with each other by the latching part 31 for the second stage of height adjustment. Once the headrest 40 and the backrest portion 30 are adjusted to a desired position, the adjustment latches 2 can engage with two corresponding ones of the height locking sites 201 on the backrest portion 20 for locking the headrest 40 and the backrest portion 30 in position with respect to the backrest portion 20.

When the backrest assembly is to be switched from the second stage of height adjustment to the first stage of height adjustment for adjusting the headrest 40 within the first height range, a caregiver can operate the release actuator 1 to cause the adjustment latches 2 to disengage from the backrest portion 20 and thereby unlock the headrest 40 and the backrest portion 30 from the backrest portion 20, wherein the the headrest 40 and the backrest portion 30 remain locked with each other by the latching part 31. Then the headrest 40 and the backrest portion 30 can be moved upward in unison until the backrest portion 30 reaches the predetermined anchor position relative to the backrest portion 20, which can exemplary correspond to a most extended position of the backrest portion 30 relative to the backrest portion 20. This upward movement of the backrest portion 30 can move the latching part 31 toward the switching actuator 4. When the backrest portion 30 reaches the anchor position relative to the backrest portion 20, the latching part 32 can engage with the anchoring portion 202 of the backrest portion 20 under the biasing action of the spring 34, and the switching actuator 4 can contact and urge the latching part 31 to rotate about the pivot axis L for disengaging the side protrusions 33 of the latching part from the anchoring portions 401 of the headrest 40. In an embodiment, the relative positions of the anchoring portion 202 and the switching actuator 4 are properly set related to the locations of the latching parts 31 and 32, so that as the latching part 31 rotates for disengaging from the headrest 40, the latching part 32 can move concurrently under the biasing action of the spring 34 for engaging with the anchoring portion 202 of the backrest portion 20. In other words, the locking status of the latching parts 31 and 32 can be switched at a same time. Accordingly, the latching parts 31 and 32 are movable in a concurrent manner for switching the lock 3 from the second locking state to the first locking state so that the backrest portion 30 is locked with the backrest portion 20 in the anchor position by the latching part 32, and the headrest 40 is unlocked from the backrest portion 30 and can slide relative to the backrest portions 20 and 30 for adjustment. Once the headrest 40 is adjusted to a desired position, the adjustment latches 2 can engage with two corresponding ones of the height locking sites 301 on the backrest portion 30 for locking the headrest 40 in position with respect to the backrest portion 30.

Advantages of the child safety seat described herein include a backrest assembly that has multiple stages of height adjustment adapted to children of different sizes and ages. Accordingly, the child safety seat may offer an extended service life.

Although the embodiments described herein provide a particular construction of the lock 3 having the aforementioned latching parts 31 and 32 that can respectively engage with the headrest 40 and the backrest portion 20, it will be appreciated that other constructions may be possible. For example, another construction may provide a lock that is slidably connected with the backrest portion 30 and can slide to selectively attach either of the backrest portion 20 and the headrest 40 to the backrest portion 30, the switching actuator 4 contacting with the lock to cause displacement of the lock for switching from the second locking state to the first locking state. Another exemplary construction may provide a lock that is movably connected with the backrest portion 30 via a resilient arm and can be moved to selectively attach either of the backrest portion 20 and the headrest to the backrest portion 30, the switching actuator 4 being configured to push against the resilient arm so as to cause an elastic deformation of the resilient arm that displaces the lock for switching from the second locking state to the first locking state. Other possible constructions can provide a lock including magnetic and/or electromagnetic elements capable of selectively attaching either of the backrest portion 20 and the headrest to the backrest portion 30, a lock including elastic elements capable of selectively attaching either of the backrest portion 20 and the headrest 40 to the backrest portion 30, or any combinations thereof.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
    a seat portion;
    a backrest assembly connected with the seat portion, the backrest assembly including a first portion, a second portion slidably connected with the first portion, and a third portion slidably connected with the second portion; and
    a backrest adjusting system carried with the backrest assembly and including a lock, wherein the lock includes a first latching part operable to lock and unlock the third portion with respect to the second portion, and a second latching part operable to lock and unlock the first portion with respect to the second portion, the second latching part being coupled to the first latching part so that the first and second latching parts are movable in unison relative to the backrest assembly.

2. The child safety seat according to claim 1, wherein the lock is provided on the second portion.

3. The child safety seat according to claim 1, wherein the second latching part is carried by the first latching part.

4. The child safety seat according to claim 1, wherein the lock further includes a spring connected with the first latching part and the second latching part.

5. The child safety seat according to claim 1, wherein the first latching part is pivotally connected with the second portion about a pivot axis.

6. The child safety seat according to claim 5, wherein the first latching part is configured to engage with the third portion at a first side of the pivot axis for locking the third portion with the second portion, and the second latching part is configured to engage with the first portion at a second side of the pivot axis opposite to the first side for locking the first portion with the second portion.

7. The child safety seat according to claim 1, wherein the lock has a first locking state where the second latching part locks the first portion with the second portion while the first latching part unlocks the third portion from the second portion so that the third portion is movable for adjustment relative to the first and second portions, and a second locking state where the first latching part locks the third portion with the second portion while the second latching part unlocks the first portion from the second portion so that the second and third portions are movable in unison for adjustment relative to the first portion, the first and second latching parts being movable in unison relative to the backrest assembly for switching the lock between the first locking state and the second locking state.

8. The child safety seat according to claim 7, wherein the backrest adjusting system further includes a switching actuator operable to cause the lock to switch between the first locking state and the second locking state.

9. The child safety seat according to claim 8, wherein the switching actuator is operable to cause the lock to switch from the second locking state to the first locking state via a contact with the first latching part.

10. The child safety seat according to claim 8, wherein the switching actuator is provided on the first portion.

11. The child safety seat according to claim 8, wherein the lock is carried with the second portion, and the switching actuator is provided on the first portion, a placement of the second portion at a predetermined position relative to the first portion causing the switching actuator to actuate the lock so that the lock switches from the second locking state to the first locking state.

12. The child safety seat according to claim 11, wherein the predetermined position corresponds to a most extended position of the second portion relative to the first portion.

13. A child safety seat comprising:
    a seat portion;
    a backrest assembly connected with the seat portion, the backrest assembly including a first portion, a second portion slidably connected with the first portion, and a third portion slidably connected with the second portion; and
    a backrest adjusting system carried with the backrest assembly and including a lock, wherein the lock includes a first latching part operable to lock and unlock the third portion with respect to the second portion, and a second latching part operable to lock and unlock the first portion with respect to the second portion, the second latching part being disposed adjacent to the first latching part, and the second latching part being coupled to the first latching part so that the first and second latching parts are movable in unison.

14. A child safety seat comprising:
a seat portion;
a backrest assembly connected with the seat portion, the backrest assembly including a first portion, a second portion slidably connected with the first portion, and a third portion slidably connected with the second portion; and
a backrest adjusting system carried with the backrest assembly and including a lock, wherein the lock includes a first latching part operable to lock and unlock the third portion with respect to the second portion, and a second latching part operable to lock and unlock the first portion with respect to the second portion, the second latching part being disposed adjacent to the first latching part, wherein the first and second latching parts are disposed on the second portion.

15. The child safety seat according to claim 14, wherein the first latching part is movable to engage with the third portion for locking the third portion with the second portion, and is movable to disengage from the third portion for unlocking the third portion from the second portion.

16. The child safety seat according to claim 14, wherein the second latching part is coupled to the first latching part so that the first and second latching parts are movable in unison.

17. The child safety seat according to claim 14, wherein the second latching part is carried by the first latching part.

18. The child safety seat according to claim 17, wherein the first latching part is pivotally connected with the second portion about a pivot axis, and the second latching part is disposed at a distance from the pivot axis.

19. The child safety seat according to claim 14, wherein the lock further includes a spring connected with the first latching part and the second latching part.

20. The child safety seat according to claim 14, wherein the lock has a first locking state in which the first latching part unlocks the third portion from the second portion and the second latching part locks the second portion with the first portion, and a second locking state in which the first latching part locks the third portion with the second portion and the second latching part unlocks the second portion from the first portion.

21. The child safety seat according to claim 20, wherein the backrest adjusting system further includes a switching actuator operable to cause the lock to switch between the first locking state and the second locking state.

22. The child safety seat according to claim 21, wherein the switching actuator is operable to cause the lock to switch from the second locking state to the first locking state via a contact with the first latching part.

23. The child safety seat according to claim 21, wherein the lock is carried with the second portion, and the switching actuator is provided on the first portion, a placement of the second portion at a predetermined position relative to the first portion causing the switching actuator to actuate the lock so that the lock switches from the second locking state to the first locking state.

24. The child safety seat according to claim 23, wherein the predetermined position corresponds to a most extended position of the second portion relative to the first portion.

* * * * *